H. C. TILLOTSON.
INTERNAL COMBUSTION ENGINE.
APPLICATION FILED JULY 19, 1912.

1,191,246.

Patented July 18, 1916.
7 SHEETS—SHEET 7.

Witnesses:
Robert F. Bracke
Leslie W. Fricke

Inventor
Harry C. Tillotson
By Brown & Williams
Attorneys

UNITED STATES PATENT OFFICE.

HARRY C. TILLOTSON, OF CHICAGO, ILLINOIS, ASSIGNOR TO KNIGHT AMERICAN PATENTS COMPANY, OF CHICAGO, ILLINOIS, A CORPORATION OF ILLINOIS.

INTERNAL-COMBUSTION ENGINE.

1,191,246.  Specification of Letters Patent.  Patented July 18, 1916.

Application filed July 19, 1912. Serial No. 710,358.

*To all whom it may concern:*

Be it known that I, HARRY C. TILLOTSON, a citizen of the United States, residing at Chicago, in the county of Cook and State of Illinois, have invented a certain new and useful Improvement in Internal-Combustion Engines, of which the following is a full, clear, concise, and exact description, reference being had to the accompanying drawings, forming a part of this specification.

My invention relates generally to internal combustion engines and has to do particularly with improvements in connection with the intake and exhaust valves employed in conjunction with such engines.

Besides advantages in the construction and utility of my improvements, my invention provides mechanism which increases the efficiency of the engine by controlling the exhaust and intake gases in an improved manner. Aside from these improved arrangements there are other features of importance which will appear as the description progresses.

My invention contemplates valve sleeves, or pistons, which have ports in their sides communicating with openings in the ends thereof and which slide in bores formed in suitably formed extensions of the combustion chamber. These sleeves are small in diameter as compared with the diameter of the main piston, and have peripheral bearing surfaces only and slide in renewable bushings, there being improved packing rings provided to prevent leakage through the bearing surfaces. These valve sleeves are made as small as the efficient communication of the gases to and from the cylinder will permit and in this way the construction of the valve mechanism may be made much simpler and more accurate than if it were necessary to use large valves of the sleeve type. By this construction I secure a number of practical advantages and improvements, such as the following: large area of valve opening, with quick opening and closing, *i. e.*, large duration of opening; direct passage for the gas, between the intake and exhaust manifolds and the combustion chamber; but a small part of the valve is exposed to the heat of combustion, the rest being surrounded by suitable water jackets; lubrication by improved means is made easy and certain by the nature of this construction; the valves are light in weight, with small inertia, thereby avoiding vibration of motor and strain on bearings; simplicity of construction and low cost of manufacture; accessibility for inspection, adjustment and repair; valves are simple in form and operate in renewable bushings, so that in the event of binding by expansion the parts may be renewed at small cost; the weight of motor is not excessive.

I would further call attention to the form of packing rings used. One of the greatest difficulties heretofore experienced in connection with valves employed in conjunction with engines of this class has been to allow for the expansion necessarily resulting from the high temperatures of operation, and at the same time to secure a perfectly gas tight packing that will prevent leakage. It has been found necessary, to insure perfect operation at all speeds, that the seal must be made effective right up to the time of opening of each valve, as well as immediately at its close. Without such a tight and secure closing there will be a waste of gases and a decrease in the efficiency of the engine. This part of my invention is directed particularly to the elimination of the objectionable features of the prior art and to this end I employ improvements in the form of packing rings which are stationarily held so as to engage the sleeve valves for all positions of the same. These packing rings are flexible, that is to say, they are made to allow for the expansion of the sleeve valves as well as to take up the wear of the valves occasioned by long usage. Sufficient clearance is provided at the ends of the rings so as to allow for their expansion under the action of the hot gases and means are provided to prevent leakage around back of the rings themselves.

My invention will be more clearly understood by referring to the accompanying drawings, in which—

Before proceeding to the description of the particular arrangement forming the subject of my invention, I shall describe briefly the engine with which such improvements are used.

Figure 1:
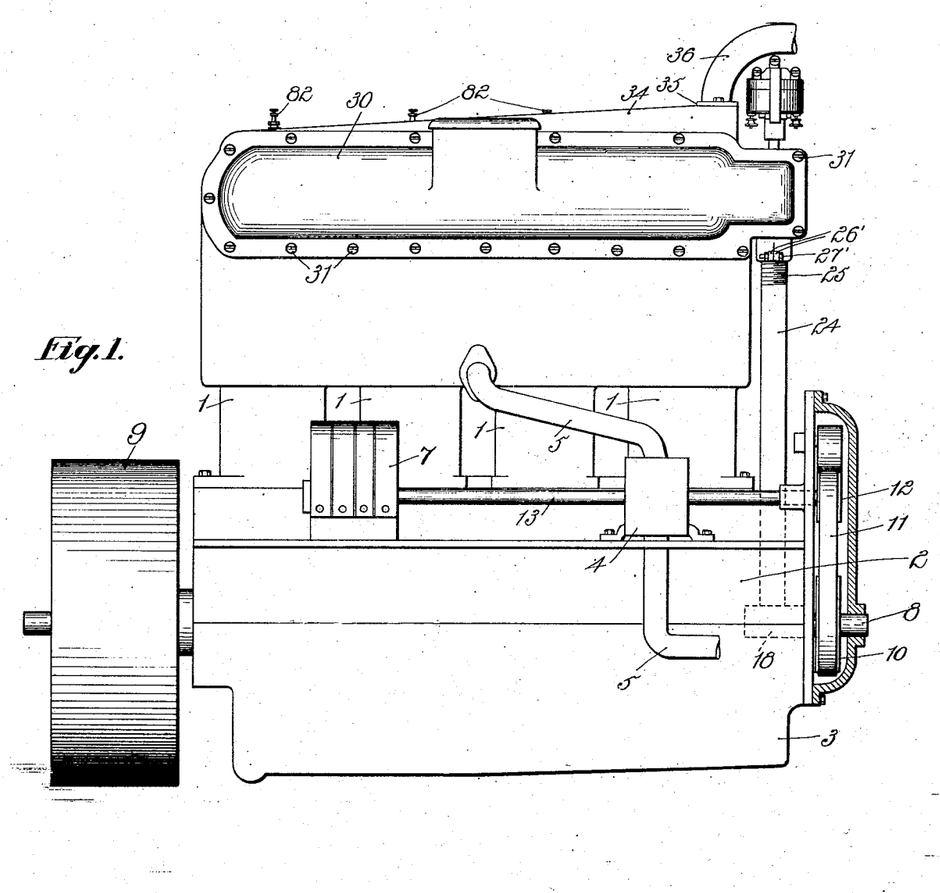
Figure 1 is a side elevational view of the engine embodying the features of my invention.
Figure 2:
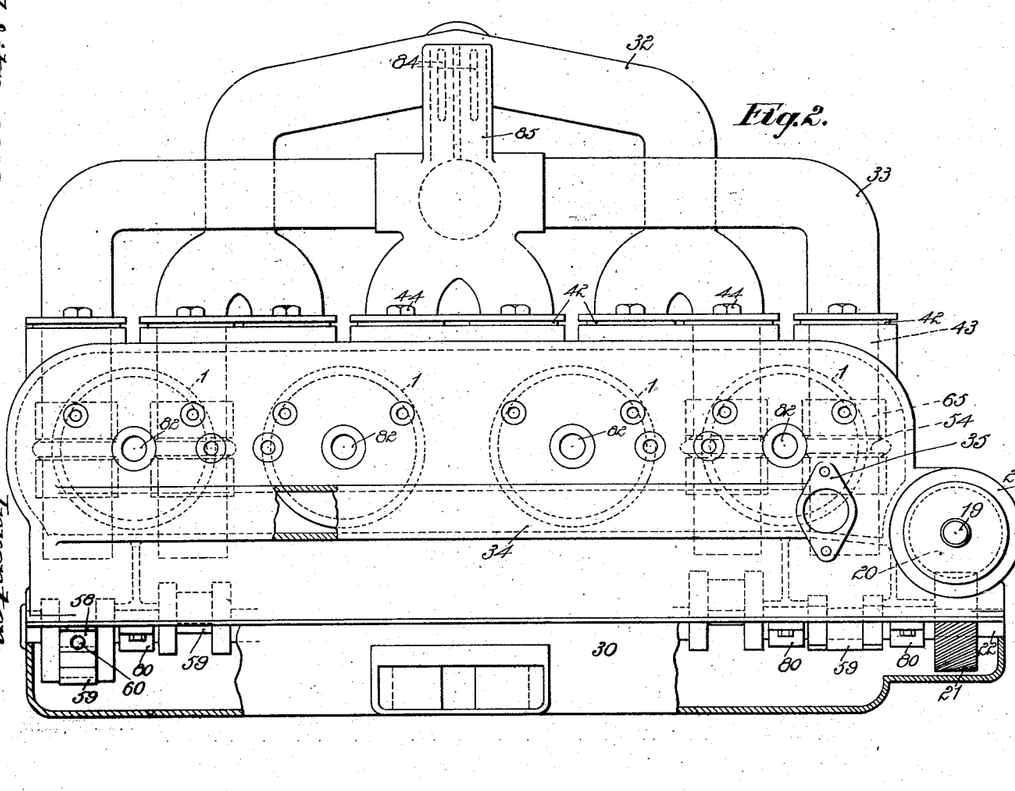
Fig. 2 is a top view thereof, some of the parts being removed and others being broken away so as to reveal the construction employed.

As shown particularly in Fig. 1, the engine has four cylinders 1, 1, which are secured to a crank case which comprises an upper portion 2 and a lower portion 3. This crank case has secured thereto a pump 4 and piping 5 is employed to convey water from the radiator to the water jackets, surrounding the upper portions of the cylinders 1. A magneto 7 is also suitably secured to the crank case and may be employed for the lighting system used in conjunction with an automobile.

Figures 3, 8:
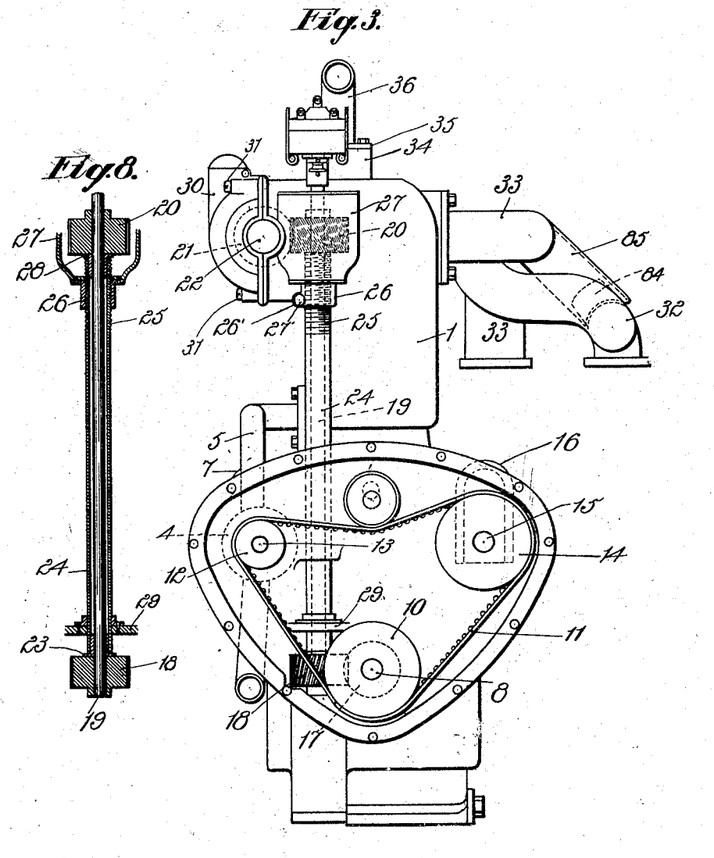
Fig. 3 is an end view of the engine with the end cover removed.
Fig. 8 is a vertical sectional view through the vertical shaft connecting the crank shaft with the valve crank shaft.

As shown in Figs. 1 and 3, a crank shaft 8 is suitably supported and has secured thereto at one end a fly wheel 9. The other end has mounted thereon a gear 10 which is connected by means of a silent chain 11 to the gear 12 secured upon the shaft 13 by which the water pump and magneto are driven. This chain also passes around the gear 14 mounted upon a shaft 15 upon which a magneto 16 is mounted, this magneto being employed with the spark plugs of each of the cylinders so as to get the proper ignition of the gases. The crank shaft 8 has mounted thereon a helical gear 17 which meshes with a similar gear 18 that is fastened to a vertical shaft 19 which has mounted at its upper end a helical gear 20 which meshes with a similar gear 21 which is mounted on the valve crank shaft 22. The vertical shaft 19 rotates in bushings 23 and 28 which are carried in a tube 24 provided with threads 25, and which engages a threaded sleeve 26 that is suitably supported from a cup-shaped member 27 forming part of the casting of which the cylinders 1 are a part. The sleeve 26 is split and is provided with two lugs 26′ through which a bolt 27′ extends, which has a nut at the other end so that these two lugs can be drawn tightly together, thus clamping the tube 24 in place. The tube 24 has a bearing 29 at its lower end extending from the crank casing 2. The purpose of threading the tube 24 into the upper bearing is so that the gears 18 and 20 may be moved vertically by applying a wrench to the outside of the tube 24 and as the gears 18 and 20 have a pitch of opposite directions, the valve timing may be thereby adjusted. It might be here stated that the gearing ratio between the crank shaft and valve crank shaft is as four to one, that is, there is a two to one ratio between each pair of gears.

The upper portion of the engine has secured thereto a cover 30 which is shown particularly in Figs. 1, 2, 3 and 5. This cover may be suitably secured to the engine by means of screws 31, 31, and it serves to inclose the valve crank shaft and the associated parts so as to prevent the accumulation of dirt, etc., around the mechanism.

On the opposite side from that on which the cover is disposed I have secured to the engine the intake manifold 32 and the exhaust manifold 33 which makes connection with the two end sliding valves and the two middle ones. The intake manifold, as illustrated, makes connection with the valves employed intermediate of those just mentioned.

The top of the engine has cast integrally therewith an arrangement for conveying the water to the radiator and which consists in the provision of a member 34 which is opened at the bottom and in connection with the water jackets of each of the cylinders and which terminates in a flanged connection 35 to which the pipe 36 leading to the radiator is secured. The member 34 as shown in Fig. 1, is inclined toward one end of the engine.

Figures 5, 20:
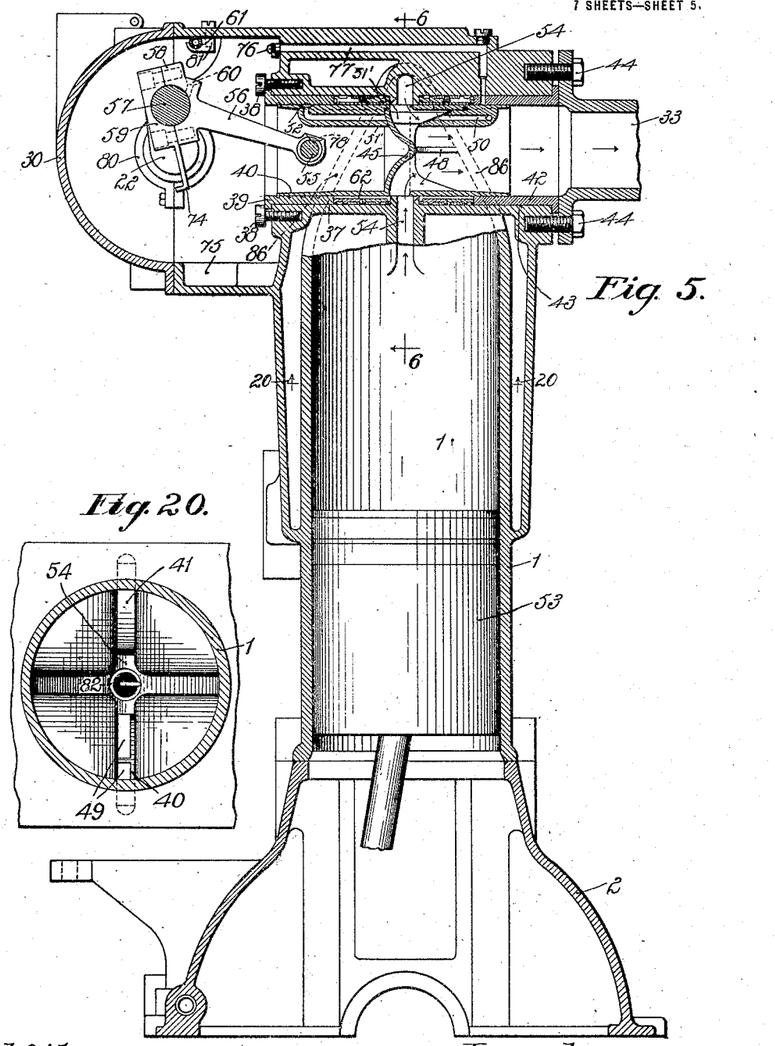
Fig. 5 is a cross-sectional view taken on line 5—5 of Fig. 4.
Fig. 20 is a view taken on line 20—20 of Fig. 5.
Figure 9:
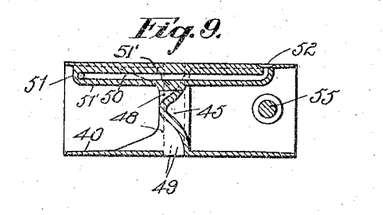
Fig. 9 is a cross-sectional view of the exhaust valve sleeve forming one of the important parts of my invention.
Figure 10:
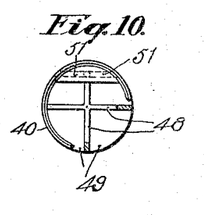
Fig. 10 is an end view of Fig. 9, some of the parts being broken away to clearly show the construction.
Figure 11:
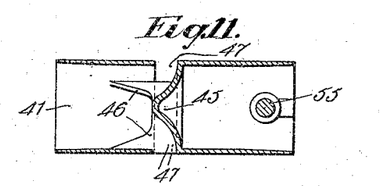
Fig. 11 is a cross-sectional view of the intake valve sleeve forming one of the important features of my invention.
Figure 12:
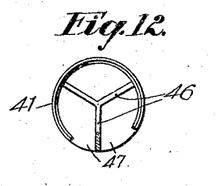
Fig. 12 is an end view thereof, some of the parts being broken away to show the construction more clearly.

Referring now to Figs. 5, 6, 7, 9 and 10 to 19 inclusive, I shall describe the mechanism which forms the embodiment of my invention. As is usual in engines of this class, there is an intake of gases during the down stroke of the engine, then there is a return compression stroke, then an explosion takes place on the down stroke, and a return exhaust stroke. I provide mechanism by means of which the proper admission and exhaust of the gases take place, this mechanism being connected with each cylinder of the engine, as shown particularly in Figs. 5 and 6. At each side of each cylinder there is a cylindrical bore 37 running transversely of the bore of the cylinders. In each of these bores there is secured by means of screws 38 a bushing 39 which forms the end supports for the exhaust valve sleeve 40 and the intake valve sleeve 41. The supporting mechanism for the other end of the exhaust valve sleeve is also in the form of a flanged bushing 42 which is held in the bore 43 by means of screws 44, 44 passing through the flange of the exhaust manifold 33. It is to be understood, of course, that the arrangement is similar for the intake valve sleeve. As shown in Figs. 5, 9, 10, 11 and 12, both the intake and exhaust valve sleeves are provided with a conical shaped portion 45 which separates the valve sleeves into two portions. The intake valve sleeve has preferably three ribs 46 connecting the two portions, thus leaving openings 47 through which the gases may enter the engine cylinder. The exhaust valve sleeve as shown in Figs. 5 and 9, is cast preferably with four ribs 48 connecting the two portions of the valve sleeve and leaving openings 49 so that gases may pass through said openings and into the exhaust manifold after an explosion has occurred in the engine cylinder. The exhaust valve sleeve is provided with a longitudinal oil bore 50 terminating in branches 51, 51 at one end of the valve sleeve and at the other end terminating in enlarged opening 52. This oil bore or passage extends through the bridge 51' connecting the two portions of the valve sleeve.

As shown in Fig. 5, the piston 53 is on the upstroke and is exhausting through the openings 49 in the exhaust valve sleeve which open to the port 54 extending around the sleeve as illustrated, and the exhaust gases of combustion are being forced into the exhaust manifold 33. The exhaust valve sleeve has a pin 55 extending across one end thereof and to which a pitman 56 is pivoted, one end of which engages the valve crank shaft at 57. An enlarged bearing 58 is provided on the pitman to which is bolted a bearing cap 59. The enlargement 58 has an oil opening 60 which is supplied with oil from the pipe 61 provided with suitable openings so that the oil may drip or spray from the pipe into the openings 60 and also upon the pitman, and from there it is splashed upon the valve sleeves, the pipe being connected with a suitable oil supply.

Figure 13:
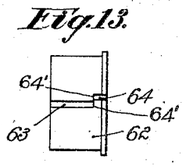
Fig. 13 is a view of the flanged split ring employed as one of the bearing surfaces for the intake and exhaust valve sleeves.
Figure 14:
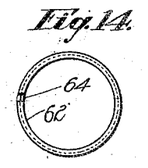
Fig. 14 is an end view of Fig. 13.
Figure 15:
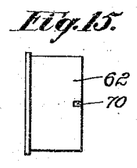
Fig. 15 is a view similar to Fig. 13 looking at the ring from the opposite side from that shown in Fig. 13.
Figure 16:
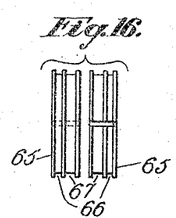
Fig. 16 illustrates the two contracting rings that are adapted to engage over the flanged ring.
Figure 17:
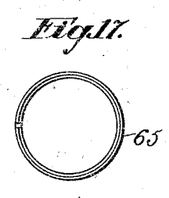
Fig. 17 is an end view thereof.

As the piston 53 reciprocates, the valve crank shaft 22 is turned and there is a consequent reciprocation of the intake and exhaust valve sleeves. It may be here stated that the intake sleeves are similarly connected to the valve crank shaft 22 as just described in connection with the exhaust valve sleeve. During this reciprocation of the intake and exhaust valve sleeves, it is necessary that there be a tight fit of these sleeves with the surfaces that they engage in order to prevent leakage of gases between the engaging surfaces. To this end I have employed a plurality of flexible packing rings which are stationarily mounted and are employed to intercept any gases that might force through the engaging surfaces of the intake and exhaust valve sleeves and their bearings. At the inner portion and near the port 54 there is arranged a flanged ring 62 which is split at 63 as shown in Fig. 13 and also at 64. By having this flanged ring split as shown the desired flexibility is secured so that when these sleeves are inserted into the bores 37 and 43 they will tightly clamp either the exhaust valve sleeve or the intake valve sleeve around which they engage. Around each of these rings 62 I have arranged heavy contracting rings 65 which are also split and which are provided at their outer periphery with grooves 66 and 67. The flanged ring 62 is made somewhat larger than necessary and it is milled out to form the slots 63 and 64 so as to provide engaging surfaces 64' which with the slots form a box joint. By providing such a joint no path is offered for the gases when the valve sleeve reciprocates owing to the coöperation of this ring with the heavy contracting rings 65 which compress the flexible flanged ring 62 so that the surfaces 64' are always in contact when the ring is in place in the bore provided for it. This ring extends beyond the distance traveled by the port or openings in the valve sleeve in one direction, and the ring which is similar extends beyond the other limit of travel of these openings.

Figure 7:
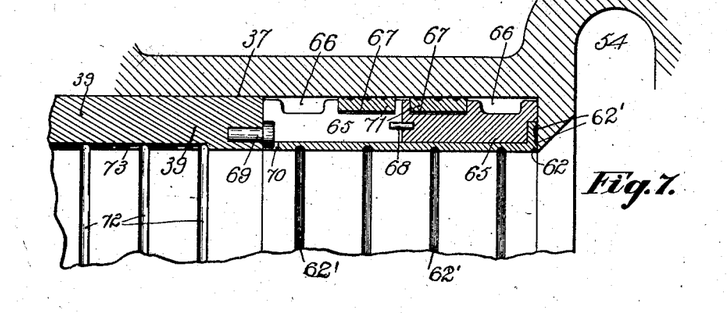
Fig. 7 is an enlarged sectional view of some of the parts shown in Fig. 5.

As shown in Fig. 7, the rings 65 do not engage the bore 37 but there is a clearance between these rings and the bore.

Figures 18, 19:
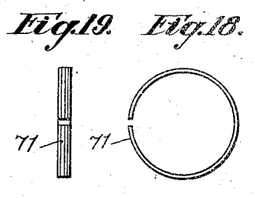
Fig. 18 is an end view of the split expanding rings employed to engage around the contracting rings.
Fig. 19 is a side view thereof.

Engaging in the grooves 67 in each one of the rings I have arranged split expanding rings 71, 71 which, as shown, engage the bore 37 and make a comparatively tight bearing contact therewith, and prevent the leakage of gases around the contracting rings. These rings are shown in Figs. 7, 18 and 19. These expanding rings have grooves for collecting the carbon of the burned fuel.

One of the contracting rings is arranged with a pin 68 projecting therefrom into the split portion of the adjacent ring 65. This ring is also provided with grooves 66 and 67 at its outer periphery. The flanged ring 62 is provided with grooves 62' for collecting the carbon deposit from the fuel.

The bushing 39 has secured thereto a pin 69 which projects therefrom and has an enlarged portion which engages in the split portion of one of the contracting rings 65 and also extends into the slot 70 of the flanged ring 62. The purpose of providing the pins 68 and 69 is to prevent any relative movement of the ring 65 with respect to the flanged ring 62 because it has been found in practice that where split rings are placed around one another there is a tendency for the split portions to come into alinement, thus offering a path for the gases to leak through these members.

This entire arrangement of rings just described provides flexible packing rings for each of the intake and exhaust valve sleeves so as to prevent leakage of the gases at each surface of engagement, that is to say, the rings are disposed in such a manner that none of the split portions of any one ring will come into alinement with the split portions of the associated ring. Thus there will be no path offered for the gases. The grooves and spaces in all the packing rings accumulate a deposit of carbon soot from the fuel or gas which offers an obstruction for the gases, thus assisting in the prevention of leakage through the joints and engaging surfaces.

In assembling, the contracting rings 65, 65 are mounted upon the flanged ring 62 and then the expanding rings are slipped into place in their respective grooves 67, 67. Then the complete arrangement can be slipped into either the groove 43 or 37, as the case may be, after which the end bushings 39 and 42 are forced into position. These rings then form a flexible packing unit of tight fit around the valve sleeves and which can be made without extreme care being used to get an exact size on the inside or outside diameter or on the ends. After the rings are assembled, the inner one is smoothed or lapped on the inside so as to have a finished surface.

The bushing 39, as shown in the drawings, is provided with a plurality of oil grooves 72 which are connected with the central oil groove 73. As the sleeve valves reciprocate a spoon 74 on the bearing cap 59 dips into an oil well 75 formed in the cylinder casting and splashes the oil all around in the chamber and into the central oil openings 73 and also into the oil cup 76 arranged at the top of the engine, this cup having connection with a channel 77 having a vertical portion registering with an opening through the bushing 42 so as to direct oil to the valve sleeve. During this reciprocation of the valve sleeve the enlarged opening 52 is brought beyond the bushing 39 and receives oil which is conveyed through the channel 50 and to the branches 51, 51 and to the engaging surfaces of the valve sleeve and the associated mechanism, thus providing an effective method of lubricating the parts. The oil which is sprayed from the pipe 61 also reaches the opening 52.

The pitman 56 is arranged with an oil opening 78 which conveys oil to the pin 55 in the proper quantities.

Figure 4:
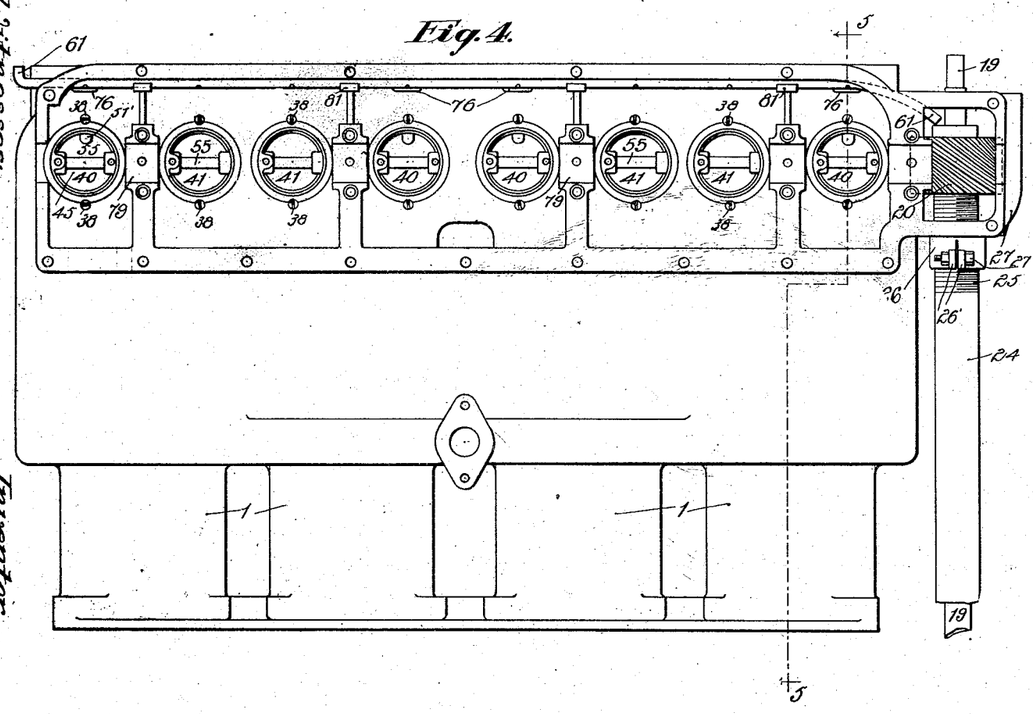
Fig. 4 is a side elevational view of the upper part of the engine having the cover for the crank casing removed.
Figure 6:
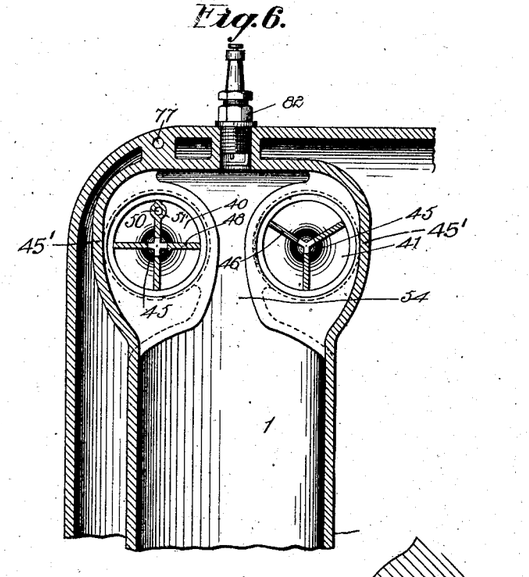
Fig. 6 is a cross-sectional view taken on line 6—6 of Fig. 5.

As shown in Fig. 4, the valve crank shaft is arranged to engage a plurality of machined bearing surfaces 79 which extend outwardly from the casting and which are employed with the bearing caps 80 which are suitably bolted to the casting. This arrangement permits the cover 30 to be removed without disturbing the bearings for the valve crank shaft, or interfering with the operation of the engine. This view also shows the arrangement for oiling the helical gear 20 and this is done by means of the pipe 61 being bent so that the proper supply of oil is given to the gears 21 and 20. This pipe 61 is held by means of clips 81 held in place by suitable screws. This provides an arrangement by which the pipe may be easily removed if desired. As shown in Figs. 1 and 6, spark plugs 82 for each cylinder are connected with the magneto 10 disposed to ignite the gases at proper intervals.

The intake and exhaust manifolds are arranged to coöperate so that the heat from the exhaust manifold 33 which is proportional to the amount of fuel vaporized may be utilized to warm the gases as they pass through the intake manifold 32. To this end I have arranged a heat equalizing device which consists in providing lugs 84, which are part of the intake manifold and extend up into a hollow hood member 85. As the gases pass through the exhaust manifold 33, the hood will become quite hot and this will heat the lugs 84 on the intake manifold, consequently heating the liquid as it is drawn into the engine. This heating arrangement is very effective inasmuch as it is a well known fact that when gases are drawn into an engine on an automobile which is running very rapidly, the intake manifold has a tendency to become cold, in fact it has a tendency to freeze and recondense the fuel already vaporized, and by utilizing the heat of the gases which are passing through the exhaust manifold, the intake manifold is heated sufficiently so as to prevent too low a temperature of the gases as they go into the engine.

The cylinder casting is formed as shown in Figs. 5 and 6 so that the valve sleeves are disposed quite close to the sides of the cylinder casting at the points 45'. The sides extend upward and downward and gradually away from the valve sleeves so as to permit the gases to have uniformity of flow around the port 54 and into the openings 47 in the intake valve sleeve when they register with this port. The cylinder is formed as shown in Fig. 5 with the walls 86 gradually converging so that the port 54 is quite narrow at the top. This particular arrangement thus forms an apex at the top of the cylinder at which the spark plug is located so that when the gases are ignited there will be an exceedingly rapid flow of such gases into the cylinder and against the piston. The gases are directed against the piston by means of the side walls which provide an arrangement essentially different from any construction of the prior art. The particular conformation of the top of the cylinder has a distinct advantage since the gases become effective against the piston the very instant that they are ignited because the novel arrangement of the top of the cylinder is an improvement by which new and improved results are obtained so as to increase the efficiency of the engine. The arrangement of the upper part of the cylinder gives a compact form to the main body of the gas, thereby keeping down the time required for the propagation of the combustion and enhancing the efficiency of the engine. A further advantage is that an almost uniform flow of gases is secured to all peripheral parts of the port or valve orifice 54 owing to the arrangement described and shown.

I have described individual intake and exhaust valve sleeves, but I wish to have it understood that only one form may be employed for both the intake and exhaust of the gases.

While I have herein shown and described one particular embodiment of my invention, it is apparent to those skilled in the art that modifications can be made without departing from the spirt and scope thereof.

What I claim as new and desire to secure by Letters Patent is:

1. In an internal combustion engine, the combination of a cylinder having ports leading thereto, a piston within said cylinder, a pair of valve sleeves for controlling the admission and exhaust of the gases to and from said cylinder, means for reciprocating said valve sleeves, and a plurality of split rings surrounding said valve sleeves and held in stationary position on opposite sides of said ports.

2. In an internal combustion engine, the combination of a cylinder having circumferentially arranged ports leading thereto, a piston within said cylinder, a pair of valve sleeves for controlling the intake and outlet of the gases to and from said cylinder through said ports, means for reciprocating said valve sleeves, and a plurality of superposed rings arranged stationarily on opposite sides of said ports and around said valve sleeves.

3. In an internal combustion engine, the combination of a cylinder having intake and outlet ports, a piston within said cylinder, a plurality of slidable valve sleeves for controlling the intake and outlet of the gases to and from the said cylinder, means for reciprocating such valve sleeves, and a plurality of superposed split rings disposed stationarily around each of said valve sleeves, said rings forming a flexible stationary packing between said sleeves and said ports.

4. In an internal combustion engine, the combination of a cylinder having ports, a crank case below said cylinder, a piston within said cylinder, a pair of horizontally slidable valve sleeves for controlling the intake and exhaust of the gases to and from said cylinder, mechanism for reciprocating said valve sleeves, and a plurality of superposed split rings for packing said ports, said rings held so as to engage around the exterior of the valve sleeves.

5. In an internal combustion engine, the combination of a cylinder having intake and exhaust ports, a piston within said cylinder, a gas admission valve sleeve operable at the top of said cylinder, a gas exhaust valve sleeve operable at the top of said cylinder, mechanism for reciprocating said valve sleeves, and a plurality of superposed rings stationarily mounted on opposite sides of said ports for engaging the outside surface of said valve sleeves.

6. In an internal combustion engine, the combination of a cylinder having inlet and outlet ports, a piston within said cylinder, a gas admission valve sleeve, a gas exhaust valve sleeve, mechanism for reciprocating said valve sleeves in accordance with the reciprocation of the piston, and a plurality of superposed split rings mounted on opposite sides of said ports so that the innermost rings will firmly engage around the outside surface of the valve sleeves.

7. In an internal combustion engine, the combination of a cylinder, a piston within said cylinder, a gas admission valve sleeve, a gas exhaust valve sleeve, mechanism for reciprocating said valve sleeves in accordance with the reciprocation of the piston, a flanged ring engaging each of said valve sleeves, means for securing said flanged rings in position, and a plurality of split contracting rings arranged around said flanged rings.

8. In an internal combustion engine, the combination of a cylinder, a piston within said cylinder, a gas admission valve sleeve, a gas exhaust valve sleeve, mechanism for reciprocating said valve sleeves in accordance with the reciprocation of the piston, a flanged ring engaging each of said valves, mechanism for securing said rings in position, a plurality of split contracting rings arranged around the flanged rings, and means for holding said flanged rings and contracting rings in a certain relative position.

9. In an internal combustion engine, the combination of a cylinder, a piston within said cylinder, a gas admission valve sleeve, a gas exhaust valve sleeve, mechanism for reciprocating said valve sleeves in accordance with the reciprocation of the piston, a split flanged ring engaging each of said valve sleeves, devices for holding said sleeves in position, a plurality of split contracting rings disposed around the split flanged rings, there being grooves in said contracting rings, expanding rings engaging in said grooves, and devices for holding each of said flanged rings and contracting rings in a certain relative position.

10. In an internal combustion engine, the combination of a plurality of cylinders, said cylinders having ports, valve sleeves for said ports, stationary packing rings on opposite sides of said ports, said rings engaging the outside of said valve sleeves, and bushings engaging said packing rings.

11. In an internal combustion engine, the combination of a casing, circumferentially arranged ports in said casing, a valve sleeve in said casing, and a plurality of stationarily mounted split packing rings on opposite sides of said ports, said rings disposed around said valve sleeves.

12. In an internal combustion engine, the combination of a casing, valve sleeves in said casing, means for reciprocating said valve sleeves, means for splashing oil from an oil well in the casing and onto said valve sleeves, said valve sleeves having oil passages extending longitudinally and transversely thereof.

13. In an internal combustion engine, the combination of a casing, valve sleeves in said casing, said valve sleeves consisting of two portions connected by webs or bridges, means for reciprocating said valve sleeves, means for splashing oil from an oil well in the casing and onto said valve sleeves, each of said valve sleeves having a longitudinal oil passage leading from one portion to the other and through one of said bridges, and transverse oil passages connected with said longitudinal passage.

14. In an internal combustion engine, the combination of a casing, valve sleeves in said casing, packing rings around said valve sleeves, and bushings engaging said packing rings, and means for oiling said valve sleeves, said bushings having grooves for collecting the superfluous oil.

15. In an internal combustion engine, the combination of a cylinder having ports, a piston within said cylinder, a gas controlling valve sleeve, means for reciprocating said valve sleeve, and a plurality of superposed packing rings arranged stationarily around said valve sleeve on opposite sides of said ports.

16. In an internal combustion engine, the combination of a cylinder having a port, a piston within said cylinder, a gas controlling valve sleeve, devices for reciprocating said valve sleeve, and a packing ring on each side of said port, each packing ring comprising a plurality of superposed rings held so as to engage around the valve sleeve at all positions thereof.

17. In an internal combustion engine, the combination of a casing having circumferentially arranged ports, a valve sleeve operating in a bore in said casing, means for reciprocating said valve sleeve, and a plurality of contracting packing rings arranged stationarily outside of said valve sleeve on opposite sides of said ports.

18. In an internal combustion engine, the combination of a casing, a valve sleeve operating in a bore in said casing, and means for reciprocating said valve sleeve, said valve sleeve comprising two cylindrical portions, one of said portions having a closed conical head, webs connecting said portions to leave openings or ports communicating with the other portion of said sleeve and an exhaust pipe forming a continuation of the bore of said casing.

19. In an internal combustion engine, the combination of a casing, a valve sleeve operating in a bore in said casing, means for reciprocating said valve sleeve, said valve sleeve comprising two cylindrical members, one of which is closed at one end by a closed conical head, webs connecting the headed end of said member with the other member, there being openings in said valve sleeve between the webs communicating with the interior of the other member and an exhaust pipe forming a continuation of said bore.

20. In an internal combustion engine, the combination of a casing, a valve sleeve operating in a bore in said casing, a stationary inner ring surrounding and pressing against said valve sleeve, a contracting ring around said inner ring, and an expanding ring surrounding said contracting ring and pressing against the bore.

21. In an internal combustion engine, the combination of a casing, a valve sleeve operating in a bore in said casing, a stationary flanged ring surrounding said valve sleeve, contracting rings surrounding said flanged ring and serving to press said flanged ring tightly against said valve sleeve, and an expanding ring engaging each of said contracting rings, the outer surfaces of which bear against the bore.

22. In an internal combustion engine, the combination of a casing, a valve sleeve adapted to reciprocate in a bore in said casing, and split packing rings disposed intermediate of said bore and said valve sleeve, said packing rings comprising an inner ring surrounding the valve sleeve, contracting rings surrounding the inner ring and pressing said ring into firm engagement with said valve sleeve, and expanding rings engaging said contracting rings and serving to press against the bore.

23. In an internal combustion engine, the combination of a casing, a valve sleeve adapted to reciprocate in a bore in said casing, and split packing rings held stationarily between the bore and said valve sleeve, said packing rings being arranged to surround the valve sleeve and the inner ring having a firm engagement with the valve sleeve, and the outer one serving to press firmly against the bore.

24. In an internal combustion engine, the combination of a casing, a valve sleeve adapted to operate within a bore in said casing, and split packing rings held stationarily between the bore and said valve sleeve, said packing rings being arranged outside of and surrounding the valve sleeve, said rings comprising a flanged ring engaging said valve sleeve, a contracting ring, and an expanding ring engaging said contracting ring and pressing against the bore.

25. In an internal combustion engine, the combination of a casing, a valve sleeve operating in a bore in said casing, a stationary inner bearing ring surrounding and pressing against said valve sleeve, a stationary contracting ring surrounding said inner ring and pressing against said casing and means for reciprocating said sleeve in said rings.

In witness whereof, I hereunto subscribe my name this 9th day of July, A. D., 1912.

HARRY C. TILLOTSON.

Witnesses:
LEONARD W. NOVANDER,
LESLIE W. FRICKE.